United States Patent
Körtge

[19]

[11] Patent Number: 6,053,196
[45] Date of Patent: *Apr. 25, 2000

[54] FLOW REGULATOR

[75] Inventor: Randolf Körtge, Usingen, Germany

[73] Assignee: LuK Fahrzeug-Hydraulik GmbH & Co. KG, Homburg, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/696,814

[22] Filed: Aug. 13, 1996

[30] Foreign Application Priority Data

Aug. 14, 1995 [DE] Germany .............. 195 29 805
Oct. 6, 1995 [DE] Germany .............. 195 37 174

[51] Int. Cl.[7] .................................... G05D 11/00
[52] U.S. Cl. ........................................... 137/115.28
[58] Field of Search .................... 417/441, 310; 137/115.13, 115.28, 115.1

[56] References Cited

U.S. PATENT DOCUMENTS

| | | | |
|---|---|---|---|
| 2,858,842 | 11/1958 | Reis | 137/108 |
| 2,916,041 | 12/1959 | Van Meter . | |
| 4,241,753 | 12/1980 | Erwin et al. . | |
| 4,546,786 | 10/1985 | Koike . | |
| 5,513,672 | 5/1996 | Nguyen et al. | 137/117 |
| 5,685,332 | 11/1997 | Overdiek et al. | 137/503 |

FOREIGN PATENT DOCUMENTS

| | | |
|---|---|---|
| 0 026 586 A1 | 9/1980 | European Pat. Off. . |
| 1018311 | 10/1957 | Germany . |
| 1262708 | 2/1962 | Germany . |
| 26 52 707 A1 | 11/1976 | Germany . |
| 37 088 17 A1 | 3/1987 | Germany . |
| 43 17 880 A1 | 5/1993 | Germany . |
| 44 13 190 A1 | 4/1994 | Germany . |
| 813572 | 5/1959 | United Kingdom . |

*Primary Examiner*—Charles G. Freay
*Assistant Examiner*—Ehud Gartenberg
*Attorney, Agent, or Firm*—Darby & Darby

[57] ABSTRACT

A flow regulator for a pump, particularly a vane pump, which regulates the fluid flow delivered to a consumer by the pump, and has a control piston acted on by the pressure built up by the pump, on the one hand, and, on the other, is acted upon by an initial force counteracting this pressure, and has a control edge, which interacts with the discharge bore, and a continuation, which penetrates an aperture, to form a delivery throttle, which is dependent on the piston path. The outside surface (31) of the continuation (25) of the control piston (5) has at least two regions (35, 37) with different outside diameters, separated from one another by a sharp-edged step (39).

8 Claims, 2 Drawing Sheets

FLOW REGULATOR

BACKGROUND OF THE INVENTION

1. Field of the Invention

The present invention relates to a flow regulator for a pump, particularly a flow regulator for regulating a fluid flow delivered by a pump.

2. Description of Related Art

Flow regulators are known. They serve to regulate the delivery provided by the pump, in order to supply a consumer with a certain volume flow. For this purpose, the flow regulators have a control piston acted on by the pump pressure, which has an initial force counteracting the pressure applied to it, and has a control edge, which interacts with the discharge bore, as well as a continuation, which penetrates an aperture, to form a delivery throttle, which is dependent on the piston path. The delivery throttle serves to essentially keep the fluid flow delivered to the consumer constant, at varying transport output of the pump. If the pressure force acting on the piston is too great, the latter is shifted against the initial force to such an extent until its control edge releases a connection to a discharge bore, through which the fluid flow delivered by the pump can flow away.

The function of the flow regulator is known, in and of itself, so that no further explanation is required here.

In connection with the flow regulator of the type being discussed here, path-dependent delivery throttles are characterized in that the volume flow varies greatly over the rpm for different load pressure values. This therefore results in a broadly spread out field of characteristic lines for the volume flow Q over the rpm of the pump n for different load pressure values applied to the consumer.

SUMMARY OF THE INVENTION

It is the object of the invention to create a flow regulator, which has a characteristic line with only very little spread, for the volume flow Q plotted above the rpm n, for different load pressure values.

This objective is accomplished using a flow regulator which regulates the fluid flow delivered to a consumer by a pump and has a control piston, a control edge which interacts with a discharge bore, and a continuation which penetrates an aperture to form a delivery throttle dependent on the piston path. The control piston is acted on by the pressure built up by the pump, on the one hand, and, on the other hand, is acted upon by an initial force counteracting this pressure. The outside surface of the continuation of the control piston has at least two regions with different outside diameters separated from one another by a sharp-edge step. Because a continuation of the control piston, which together with an aperture forms a path-dependent delivery throttle, has at least two regions with different outside diameters on its outside surface, which regions are separated from one another by a sharp-edged step, the characteristic lines of the volume flow Q of the pump, plotted against the rpm n, can be influenced for different load pressure values in such a way that there is only a slight variation. The effort required for this is significantly less than for flow regulators dependent on dynamic pressure, which also have a much more complicated structure.

A preferred embodiment of the flow regulator is characterized in that the step formed in the outside surface of the continuation and the related aperture are coordinated with one another in such a way that the control edge of the control piston is precisely tangential to the discharge bore when the step is arranged within the aperture. This arrangement of the step and the aperture, seen in the axial direction, ensures that spread of the characteristic lines is prevented, to a great extent, even at a relatively low rpm.

An embodiment of the flow regulator, in which the aperture has a very slight width, measured in the axial direction of the control piston of the flow regulator, is preferred. This structure leads to a further reduction in the variation of said characteristic lines.

BRIEF DESCRIPTION OF THE DRAWING

The invention will be explained in greater detail below, on the basis of the drawings, in which.

DETAILED DESCRIPTION OF THE PREFERRED EMBODIMENTS

Figure 1:
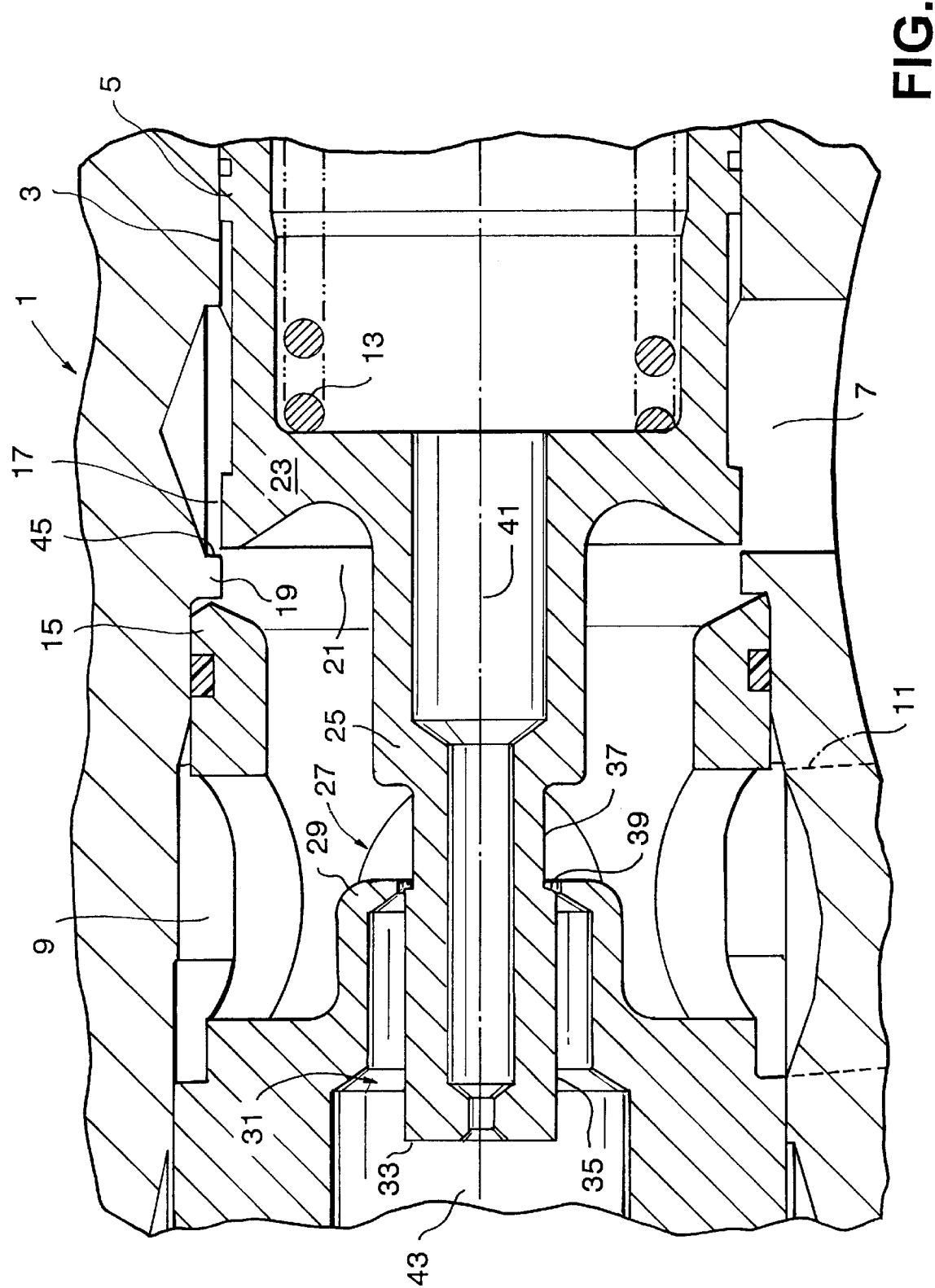
FIG. 1 shows a detail of a flow regulator in longitudinal section in accordance with the present invention.

The cross-sectional drawing according to FIG. 1 shows a detail of a flow regulator 1 in longitudinal section; it comprises a control piston 5 guided in a bore 3, which, in its rest position, closes off a discharge bore 7 connected with the tank of a pump, particularly a vane pump, relative to a pressure space 9, which is connected with the transport or pressure side of a pump via a pressure line 11, indicated by a broken line. The control piston 5 is acted on, on the one hand, by the pressure prevailing in the pressure space 9, which exerts a pressure force on the control piston 5 acting from left to right in FIG. 1. This pressure force is counteracted by a spiral spring 13, which exerts an initial force on the control piston 5, pressing it to the left against the stop 15 in the pressureless state. In this position, the control piston 5 closes off the discharge bore 7, which opens into the bore 3 of the flow regulator 1, with a radial sealing surface 17, which interacts with a radial sealing region 19 of the bore 3. A slide valve is thus formed here. In the example shown here, a control edge 21 of the control piston 5 rests against the stop 15, forming a seat seal or a seat valve here.

A continuation 25, which penetrates the pressure space 9, proceeds from the base element 23 of the control piston 5; it is passed through an aperture 29 to form a path-dependent delivery throttle 27. The outside surface 31 of the continuation 25 has two regions with different outside diameters, where a first segment 35 is provided at the free, distal end 33 of the continuation 25, whose diameter is greater than that of a second segment 37, which is closer to the base element 23. The first segment 35 makes a transition into the second segment 37 by way of a sharp-edged step 39, with the first segment 35 making a vertical drop in the region of the step 39, that is, in the radial direction towards the center axis 41 of the control piston 5, towards the second segment 37. It is also possible that the first segment 35 goes over into the second segment 37 over a very short inclined surface or ramp extending at an angle of greater than 90°. The axial extent of the inclined surface or ramp preferably is only about 1 mm.

The outside diameter of the first segment 35 is slightly smaller than the inside diameter of the aperture 29, so that a free ring area is formed when the first segment 35 is arranged in the region of the aperture 9. A fluid transported by the pump into the pressure space 29 passes through this ring area into an output region 43, to which a connecting line for a consumer supplied by the pump is connected.

It is evident from the representation of FIG. 1 that the width of the aperture 29, measured in the axial direction, that is, measured in the direction of the center axis 41, has been selected to be very small. The aperture 29 is thus also structured with very sharp edges, so that it is practically a cutting edge.

The distance of the step 39 from the control edge 21, measured in the axial direction, is coordinated with the distance between the aperture 29 and the edge 45 of the discharge bore facing it in the pressure space 9 in such a way that the step 39 is arranged within the aperture 29, while the control edge 21 of the control piston 5 is just tangential to the discharge bore 7, in other words, touches the edge 45.

If after all this there is no pressure or only slight pressure in the pressure space 9, the control piston 5 is forced to the left against the stop 15 by the initial force of the spiral spring 13. In this position, the pressure space 9 is separated from the discharge bore 7 by the seat valve formed by the stop 15 and the control edge 21. In this position, the second segment 37, which has a smaller outside diameter than the first segment 35, is located in the region of the aperture 29, so that a relatively large ring area is left free and a fluid transported into the pressure space 9 can reach the output region 43 through this ring area.

When the pressure in the pressure space 9 increases as the rpm or the counter-pressure of the consumer increases, the control piston 5 is displaced towards the right, against the initial force of the spiral spring 13, so that the control edge 21 is at a distance from the stop 15. This leaves the pressure space 9 separated from the discharge bore 7, because of the interaction of the sealing surface 17 and the sealing region 19, resulting in a radial seal or a slide seal.

Even if the control piston 5 is displaced to the right, the second segment 37 at first remains arranged in the region of the aperture 29, so that a greater delivery to the consumer results due to the increased pressure, while the ring area remains the same.

If the pressure in the pressure space 9 continues to rise, the control piston 5 is displaced further to the right, and with it also the continuation 25, which is rigidly connected with it. Finally, the control edge 21 of the control piston reaches the edge 45 of the discharge bore 7. By coordinating the axial arrangement of the step 39 relative to the aperture 29, the step 39 reaches the aperture 29 precisely when the control edge 21 reaches the edge 45. In other words, precisely at the moment when oil can flow out of the pressure space into the discharge bore 7, preventing a further increase of the pressure in the pressure space 9 for the time being, the step 39 also reaches the aperture 29, so that the discharge cross-section of the delivery throttle 27 is abruptly reduced. The fluid present in the pressure space 9 can now only flow into the output region 43 through the smaller ring area, which remains free between the first segment 35 and the inside surface of the aperture 29.

By means of the interaction of the step 39 with the aperture 29 and of the control edge 21 with the edge 45, the result achieved is that the spread of the Q/n characteristic lines is greatly reduced. This results in a direct comparison of FIGS. 2 and 3.

Figure 2:
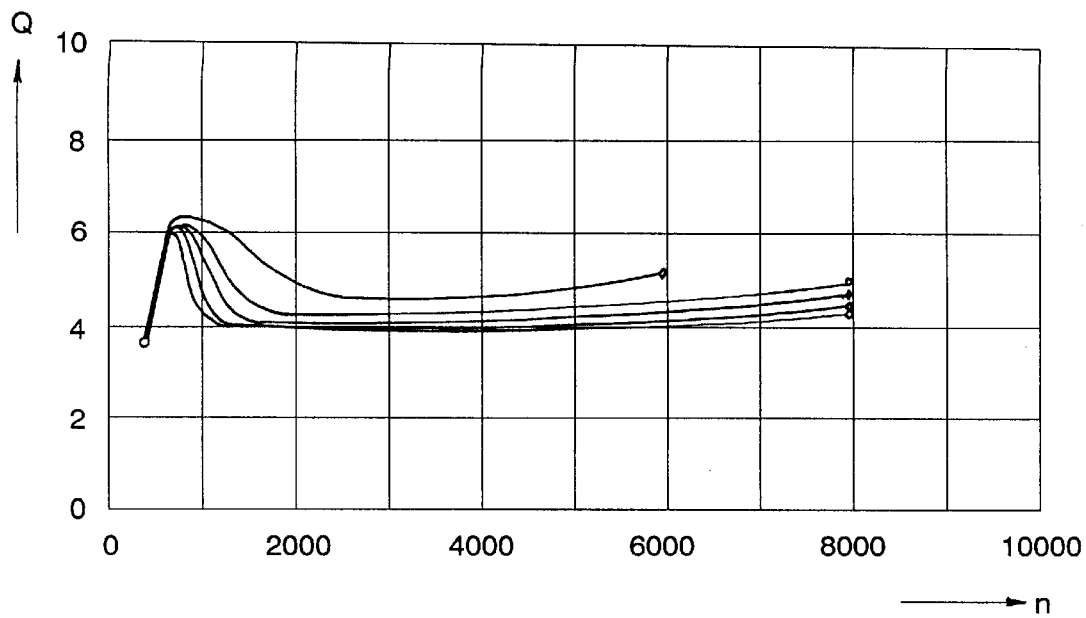
FIG. 2 shows a Q/n characteristic line field for a pump equipped with a flow regulator according to FIG. 1.

FIG. 2 shows a characteristic line field, in which a volume flow Q of a pump is plotted against its rpm n for various load pressure values. The bottom curve is plotted for a load pressure of 3 bar; the ones above that for 5 bar, 10 bar, 20 bar and 50 bar. It is clearly evident that the volume flow Q hardly varies for different load pressure values, even if the rpm n increases in a region above about 2,500 rpm.

Figure 3:
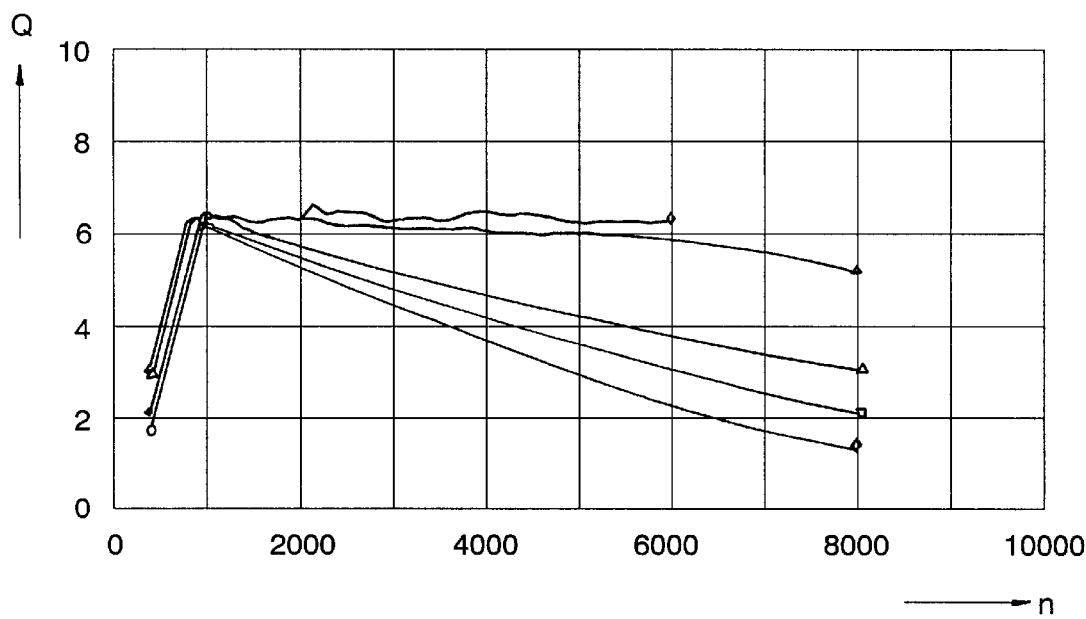
FIG. 3 shows a Q/n characteristic line field of a conventional, path-dependent flow regulator.

If this is compared with the Q/n characteristic lines of a conventional path-dependent flow regulator, reproduced in FIG. 3, it is evident that there the volume flows for different load pressure values differ greatly from one another, in other words, that they are spread out. In the characteristic line field of FIG. 3, the bottom curve is also plotted for a load pressure of 3 bar; the ones above it for 5, 10, 20 and 50 bar.

It is specifically the comparison of the Q/n characteristic lines of FIGS. 2 and 3, which makes the particular effect of the special structure of the flow regulator 1 evident. For the path-dependent flow regulator described here, the characteristic line field is such as was otherwise only present for flow regulators dependent on dynamic pressure, which can only be implemented with numerous additional parts and therefore only at high costs.

What is claimed is:

1. A flow regulator for regulating a fluid flow delivered by a pump, comprising:

a housing having a piston bore, a discharge bore, and a pressure space defined therein, the discharge bore and pressure space being in fluid communication with the piston bore;

a control piston disposed in the bore of said housing, said control piston having a base, a control edge that interacts with the discharge bore, and a continuation projecting from the base, the continuation including a first region having a first outer diameter and a second region having a second outer diameter smaller than the first outer diameter, the first and second regions being separated by a sharp-edge step, the control piston being acted on in a first direction by a first pressure generated by the pump and acted on in a second direction by an initial force counteracting the first pressure; and a plug disposed in the bore and having an aperture defined in one end to receive said continuation and form a delivery throttle dependent on a path of the control piston, the aperture having an inner diameter which is greater than the first outer diameter to form a free ring area therebetween when the first region and aperture coincide.

2. The flow regulator in accordance with claim 1, wherein the step and aperture are arranged relative to one another so that when the step is disposed in the aperture, the control edge of said control piston is substantially tangential to the discharge bore.

3. The flow regulator in accordance with claim 1, wherein the aperture has a very slight width as measured in an axial direction of said control piston.

4. The flow regulator in accordance with claim 2, wherein the aperture has a very slight width as measured in an axial direction of said control piston.

5. The flow regulator in accordance with claim 1, wherein said pump is a vane pump.

6. The flow regulator in accordance with claim 1, wherein the base of said control piston has a diameter greater than the first outer diameter.

7. The flow regulator in accordance with claim 1, wherein the piston bore has a diameter greater than the first outer diameter.

8. The flow regulator in accordance with claim 1, wherein the aperture is disposed proximate the pressure space, while the control edge is disposed proximate the discharge bore.

* * * * *